United States Patent
Fiedler

[19]

[11] Patent Number: 5,941,544
[45] Date of Patent: Aug. 24, 1999

[54] BOAT TRANSPORTING DEVICE

[76] Inventor: Mark D. Fiedler, 17 Sylvan Way, North Swanzey, N.H. 03431-4480

[21] Appl. No.: 08/686,739

[22] Filed: Jul. 24, 1996

[51] Int. Cl.⁶ .................................................. B62B 1/00
[52] U.S. Cl. ..................................... 280/47.331; 114/344
[58] Field of Search ............................ 280/414.1, 414.2, 280/47.131, 47.331; 114/344

[56] References Cited

U.S. PATENT DOCUMENTS

| | | | |
|---|---|---|---|
| Re. 32,844 | 1/1989 | Horowitz | 280/47.331 |
| 2,361,592 | 10/1944 | Bjork . | |
| 2,395,717 | 2/1946 | Bjork . | |
| 2,412,162 | 12/1946 | Lindblom . | |
| 2,809,048 | 10/1957 | Kytola | 280/414.1 |
| 2,848,243 | 8/1958 | Young | 280/47.331 |
| 3,101,203 | 8/1963 | Raymond | 280/414.2 |
| 3,159,410 | 12/1964 | Raymond | 280/414.2 |
| 3,337,243 | 8/1967 | Rued | 280/414.2 |
| 3,671,056 | 6/1972 | Windemuth . | |
| 4,579,357 | 4/1986 | Webster . | |
| 4,641,874 | 2/1987 | Grenzer . | |
| 4,936,595 | 6/1990 | Cunningham . | |
| 5,072,959 | 12/1991 | Marullo | 114/344 |
| 5,203,580 | 4/1993 | Cunningham . | |
| 5,261,680 | 11/1993 | Freitus et al. | 114/344 |

*Primary Examiner*—Robert J. Oberleitner
*Assistant Examiner*—Min Yu
*Attorney, Agent, or Firm*—David and Bujold

[57] ABSTRACT

A boat transporting device comprising a pair of L-shaped longitudinal members positioned along top surfaces of and proximate the bow end of a boat to be transported. A first cross member is adjustably secured, at opposed ends thereof, to first ends of the longitudinal members and secures, via a first clamping member, the first end portion of the longitudinal members to the gunwales of the boat. A second cross member is adjustably secured, at opposed ends thereof, to an intermediate section of the longitudinal members for and securing, via a second clamping member, the second end portion of the longitudinal members to the gunwales of the boat. A third cross member is adjustably secured, at opposed ends thereof, to a second end of the longitudinal members. An axle is attached to the longitudinal members, via a pair of brackets located intermediate the first and second end of the longitudinal members, and a pair of wheels are attached to opposed ends of the axle.

19 Claims, 3 Drawing Sheets

BOAT TRANSPORTING DEVICE

FIELD OF THE INVENTION

This invention relates to a boat transporter and, more particularly, to a wheeled device for use by an individual to transport a boat across a desired surface or to assist with raising a boat onto a roof of a vehicle.

BACKGROUND OF THE INVENTION

Small boats, canoes and other vessels are often used in areas where they must be transported across dry land to, between, or from a body of water. These vessels are often carried to a body of water on the roof of a vehicle. When two or more individuals are present, removing the boat from the roof of the vehicle, transporting the boat to and from the body of water, and returning the boat to the roof of the vehicle is a relatively easy task. When an individual is alone, however, such tasks can be very difficult.

Vessel transporters of various designs are well known in this art. Some transporters comprise yokes, some have carrying handles, while others are one or two wheeled devices. The wheeled devices vary greatly as some are end mounted to the vessel, some are mid-mounted along the length of the vessel, some transport the vessel in an upright position, while others transport the vessel in an inverted position.

When using a yoke, the entire weight of the boat must be borne by the individual. When using carrying handles, two individuals generally must be present. Most of the wheeled devices must be entirely removed from the boat before the boat can be used, while those that are not totally removed from the boat can be extremely awkward when left on or attached to the boat.

SUMMARY OF THE INVENTION

Wherefore, it is an object of the present invention to overcome the aforementioned problems and drawbacks associated with the prior art designs.

Another object of the invention is to provide a boat transporting device which is relatively simple in construction, has a streamlined appearance, and can easily be custom fit to boats of different shapes and sizes.

Yet another object of the invention is to provide a boat transporting device which can be easily used by a single person.

Still another object of the invention is to provide a boat transporting device whose frame can, if desired, remain attached to the boat during use without interfering with use and enjoyment of the boat.

A further object of the invention is to provide a boat transporting device that is lightweight and has a narrow track.

Still yet another object of the invention is to provide a boat transporting device that can assist in loading a boat onto or removing the boat from the roof of a vehicle.

A still further object of the invention is to provide a boat transporting device with wheels which can easily be changed to accommodate different types of ground surfaces or terrain.

Yet another object of the invention is to provide a boat transporting device that can be quickly and easily clamped to and removed from a desired boat.

The present invention relates to a boat transporting device for use by an individual transporting a boat, said boat transporting device comprising a pair of longitudinal members each being configured to extend along and accommodate a longitudinal length of a gunwale of a boat; a clamping mechanism being supported by said longitudinal members for securing said boat transporting device to the gunwale of a boat; an axle being secured to the longitudinal members; and a pair of wheels being securable to opposed ends of the axle.

The present invention also relates to a boat in combination with a boat transporting device, said boat is capable of being transported by an individual, said boat comprising a bow and a stern; an exterior surface to provide desired floatation to the boat; and a pair of gunwales extending from the bow to the stern along each longitudinal edge of the boat; said boat transporting device comprising a pair of longitudinal members each being configured to accommodate a gunwale of a boat; a first cross member being secured to each of the longitudinal members adjacent first ends thereof; a third cross member being secured to each of the longitudinal members adjacent second ends thereof; a clamping mechanism being supported by said device for securing said boat transporting device to the gunwale of a boat; an axle being secured to the longitudinal members; and a pair of wheels being securable to opposed ends of the axle.

The present invention additionally relates to a method of transporting a boat by an individual with a boat transporting device, said method comprising the steps of providing a pair of longitudinal members each being configured to accommodate a gunwale of a boat; securing a first cross member to each of the longitudinal members adjacent first ends thereof; securing a third cross member to each of the longitudinal members adjacent second ends thereof; attaching said boat transporting device to gunwales of a desired boat via a clamping mechanism; securing an axle to the longitudinal members; and providing a pair of wheels to opposed ends of the axle whereby a portion of the weight of the boat is supported by said boat transporting so as to facilitate transport of the boat attached to said boat transporting.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
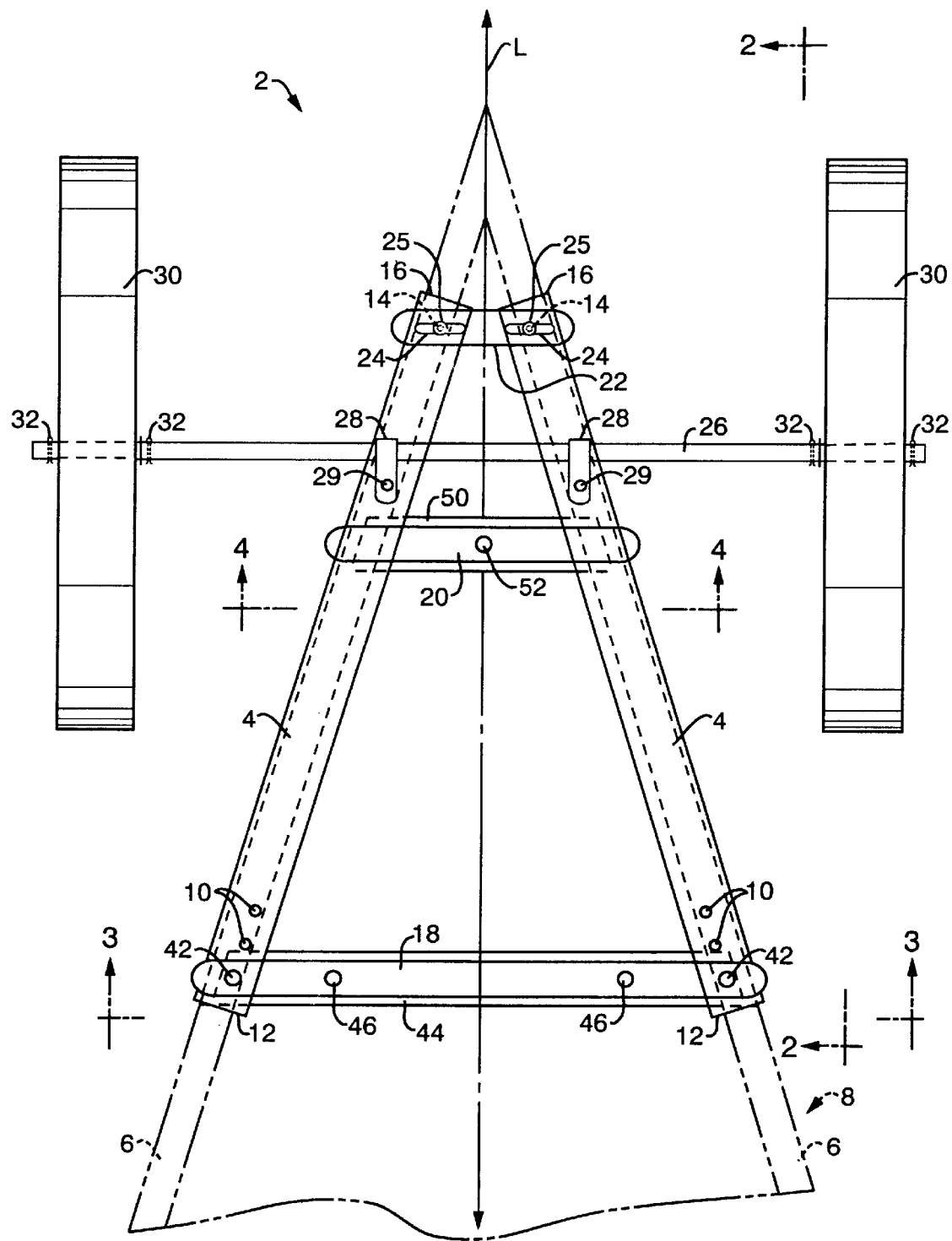
FIG. 1 is a diagrammatic top plan view of the boat transporting device of the present invention shown attached to a boat.

Turning now to FIGS. 1 to 4, a detailed description concerning the boat transporting device, according to the present invention, will now be provided. The boat transporting device, generally designated by reference numeral 2, comprises a pair of elongate longitudinal members 4 positioned along the top surfaces the gunwales 6 of a boat 8 proximate the one end of a boat 8, e.g. generally the bow end of the boat. Longitudinal members 4 have an L shaped cross section (FIG. 3) with a first portion of the L shaped cross section lying along the top surface of gunwale 6 and a second portion of the L shaped cross section extending downward along an outward facing surface of gunwale 6. Longitudinal members 4 each have a plurality of adjustment clamping apertures 10 (FIG. 1) proximate a first end 12 thereof and an aperture 14 proximate a second end 16 thereof so that boat transporting device 2 can readily accommodate a plurality of boats 8 of different shapes and sizes.

Opposed ends of a (one) first cross member 18 are secured, via fasteners 42 being located in a desired one of the adjustment clamping apertures 10, to the first end of longitudinal members 4. First cross member 18 cooperates with a first clamping member 44, via releasable fasteners 46, for securing the first end portion of boat transporting device 2 to the boat 8. A detailed description of first cross member 18 and first (further) clamping member 44 and their function will be provided below.

Figure 4:
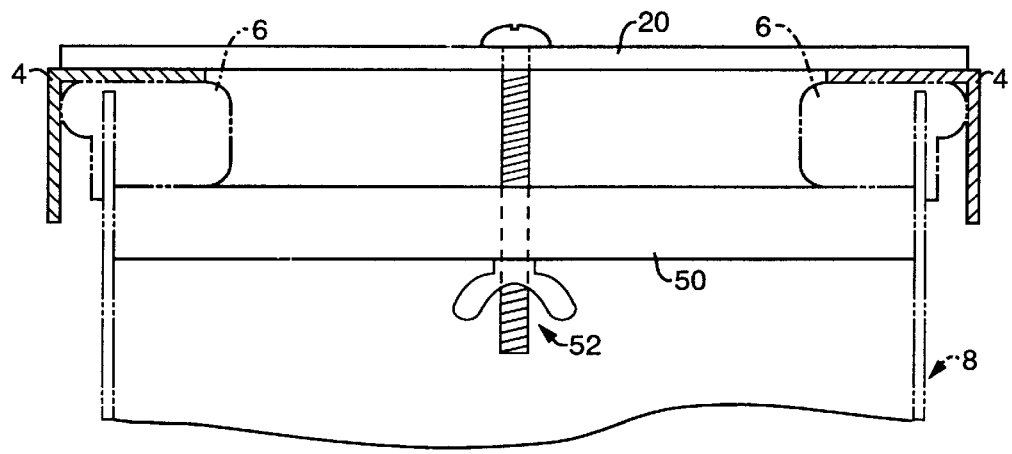
FIG. 4 is a diagrammatic partial cross sectional view of the boat transporting device taken along section line 4—4 of FIG. 1.

A second cross member 20 is positioned intermediate the first and second ends 12, 16 of longitudinal members 4. Opposed ends of second cross member 20 may be permanently affixed to an intermediate portion of each longitudinal member 4 (not shown) or may be releasably attached thereto by a releasable fastener (FIG. 4). Second cross member 20 cooperates with a second (one) clamping member 50, via at least one releasable fastener 52, for securing the second end portion of boat transporting device 2 to the boat 8. A further detailed description of second cross member 20 and second clamping member 50 and their function will be provided below.

A slot 24 is provided proximate each opposed end of a third further cross member 22 which aligns with aperture 14 provided adjacent the second end of longitudinal members 4. A fastener 25 extends through each slot 24 and each mating aperture 14 for securing each of the opposed ends of third cross member 22 to longitudinal members 4. It is to be appreciated that although fasteners 25 are indicated in the drawings as being nuts and bolts, it is to be appreciated that fasteners 25 may be any other known fastener which will securely fasten second cross member 22 to longitudinal members 4. This arrangement facilitates adjustment of the angle formed by the two longitudinal members 4 as well as the spacing between those two members 4 of device 2.

Longitudinal members 4, first cross member 18 and third cross member 22 form a substantially A-shaped structure or framework and also define a longitudinal axis L of the framework.

Axle 26 is secured adjacent, but spaced from, the second end of longitudinal members 4 via a pair of spaced apart brackets 28. Each bracket 28 is provided with a bore (not numbered) extending therethrough for mounting bracket 28 to one of the longitudinal members 4. A pair of threaded fasteners 29 are inserted through the bores provided in longitudinal members 4 and brackets 28 in order to securely fasten one bracket 28 to each longitudinal member 4. Threaded fasteners 29 may be any releasable fastener such as a threaded nut and bolt which preferably allow brackets 28 to pivot slightly to facilitate adjustment of device to different sized boats 8.

A pair of spaced apart bores (not numbered) are provided adjacent each opposed end portion of the axle 26. A pair of conventional wheels 30 are mounted on opposed ends of axle 26 but in a spaced apart relationship from the remainder of the device. Each wheel 30 is preferably provided with a bearing which allows the wheel to rotate freely about axial 26. A pair of retaining pins 32 are inserted through the bores provided in each end portion of axle 26, once the wheels 30 are supported by axle 26, to retain wheels 30 on axle 26 during use. It is to be appreciated that pins 32 may be cotter pins, spring type clip pins, or any other releasable fastening device which can easily and quickly be removed in order to allow wheels 30 to be removed from axle 26 and also allow axle 26 to be removed from brackets 28. As such feature is well known to those skilled in this art, a further detailed description concerning the same is not provided herein.

By providing an easy mechanism for removing wheels 30, a quick and easy change in the size and/or type of wheels 30 used on the boat transporting device 2 is facilitated. For instance, when transporting boat 8 across sand or other soft terrain, a wider wheel 30 may be used to facilitate easier transport of boat 8 while larger diameter wheels 30 may be used on rough or rocky surfaces.

Figure 2:
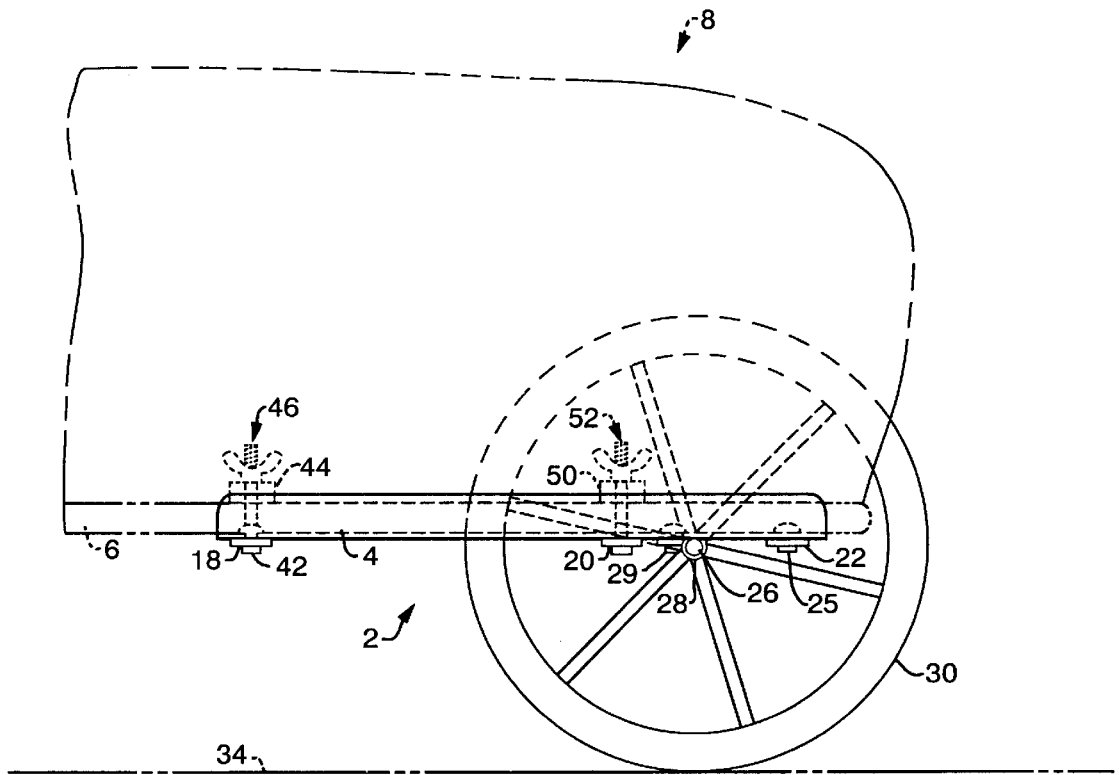
FIG. 2 is a diagrammatic partial cross sectional view of the boat transporting device taken along section line 2—2 of FIG. 1.

Turning now to FIG. 2, boat transporting device 2 can be seen in its in use position. The boat 8, having boat transporting device 2 secured to a top portion thereof, is inverted so that a bottom surface of boat 8 faces upward. Wheels 30 thus contact the ground 34, or any other surface upon which boat transporting device 2 is placed, so that boat 8 can easily be wheeled along ground 34.

Figure 3:
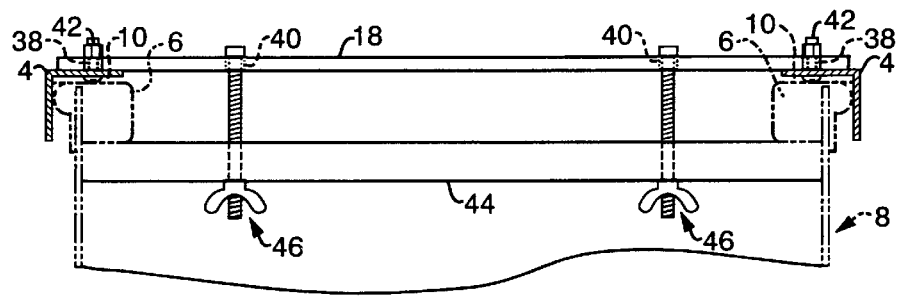
FIG. 3 is a diagrammatic partial cross sectional view of the boat transporting device taken along section line 3—3 of FIG. 1.

Turning now to FIG. 3, a detailed description of first cross member 18 will now be provided. First cross member 18 has a pair of outer apertures 38 located proximate opposed ends thereof and a pair of intermediate apertures 40 located along an intermediate section of first cross member 18. First cross member 18 is secured to longitudinal members 4, via a pair of fasteners 42 which are inserted through outer apertures 38 and a desired one of the clamping apertures 10 provided in the first end of longitudinal members 4. First cross member 18 extends generally perpendicular to the longitudinal axis L of the framework. The selected clamping aperture 10 varies depending upon the size and shape of the bow end of boat 8, e.g. the angle formed by the two gunwales and the distance between the gunwales. It is to be appreciated that simple trial and error may be required in some situations. Fasteners 42 may be a threaded nut and bolt or any other type of fastener which will securely fasten first cross member 18 to longitudinal members 4.

First clamping member 44 is positioned generally perpendicular to longitudinal axis L and aligned parallel to first cross member 18 with gunwales 6 being sandwiched between longitudinal members 4 (and/or first cross member 18) and first clamping member 44. Releasable fasteners 46 are inserted through intermediate apertures 40 and through mating holes provided in first clamping member 44 which are aligned with intermediate apertures 40. It is to be appreciated that releasable fasteners 46 may be threaded bolts with wing nuts fastened thereto, or any other fastener which can be easily and securely fasten and unfasten first clamping member 44 to first cross member 18, thereby allowing these members to be quickly and easily secured to and removed from the gunwales of boat 8, as desired. As the wing nut of the fasteners 46 are tightened, the first clamping member is biased toward first cross member 18 thereby sandwiching and clamping both gunwales therebetween to securely fasten the first end of the device to the boat.

Turning now to FIG. 4, a detailed description of second cross member 20 will now be provided. Second cross member 20 has opposed ends which have a lower surface in contact with longitudinal members 4. Second cross member 20 extends generally perpendicular to the longitudinal axis L of the A-shaped framework. Second clamping member 50 is positioned generally perpendicular to the longitudinal axis L and aligned parallel to second cross member 20 with gunwales 6 and longitudinal members 4 being sandwiched between second cross member 20 and second clamping member 50. Second clamping member 50 also extends generally parallel to first cross member 18 and third cross member 22. Second clamping member 50 is secured to second cross member 20 via at least one releasable fastener 52 which is inserted through the mating bores provided in second cross member 20 and second clamping member 50. It is to be appreciated that the number releasable fasteners 52 can be increased, as desired, and releasable fastener 52 may be a threaded bolt with a wing nut fastened thereto, or any other fastener conventional fastener which can easily and securely fasten second clamping member 50 to second cross member 20 with longitudinal members 4 and gunwales 6 sandwiched thereby allowing clamp 20 to be quickly and easily secured to and removed from boat 8 when desired.

Figure 5:
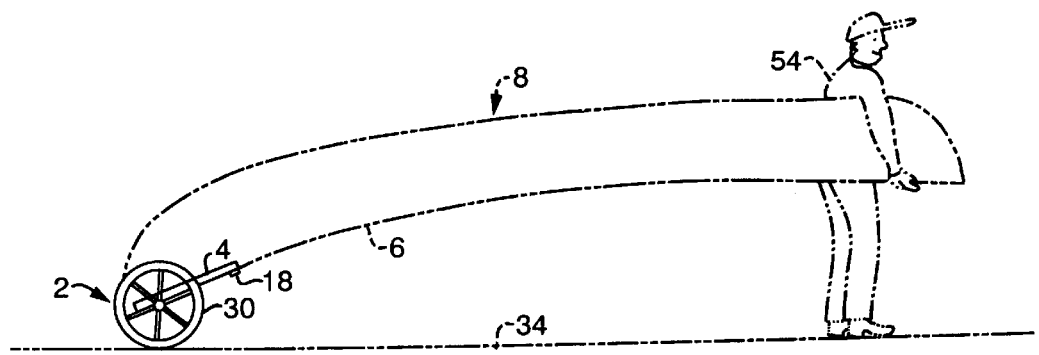
FIG. 5 is a diagrammatic side elevational view of the boat transporting device, shown in an inverted use position when an individual is transporting a boat.

As can be seen in FIG. 5, when the boat transporting device 2 is mounted to one end of a boat 8, an individual 54 can easily support the opposite end and transport the boat 8 without assistance from another person. This is achieved simply by elevating and grasping the end of boat 8 remote from boat transporting device 2 by hand and either pushing or pulling the boat 8 in the desired direction. It is to be appreciated that approximately 50% of the weight of boat 8 is supported by device 2 and, therefore, the remaining weight of the boat, i.e. approximately 50% of the weight of boat 8, is supported by the individual 54.

Boat transporting device 2 can also be used to assist a user with placing a boat 8 on top of a vehicle carrying roof racks. This is done simply by individual 54 raising the end of boat 8 remote from boat transporting device 2 a sufficient height to allow that end of a boat to be partially supported by the roof racks of the vehicle. Thereafter, once the boat is adequately balanced on the roof racks of the vehicle, the opposite end of the boat 8 attached to the boat transporting device 2 can be loaded onto the roof racks of the vehicle by picking up the opposite end of the boat and "working", e.g. rocking and/or sliding, the boat so that it is completely supported by the roof racks. Thereafter, device 2 can either be removed from the boat to facilitate less wind resistance or drag during transport of the boat to another desired location or can remain positioned on the boat, if desired. By reversing the above indicate loading procedure, an individual can easily remove the boat 8 from the vehicle without assistance from anybody else. The present invention allows individual 54 to transport boat 8 great distances with relative ease.

The A shaped framework, according to the present invention, allows the longitudinal members to pivot relative to one another to adjust for boats of different shapes and sizes so that the device readily accommodate canoes, for example, having different bow constructions. The first, second and third cross-members allows easy adjustment of the longitudinal members so that they can closely accommodate and follow the gunwales of a desired boat. It is to be appreciated that longitudinal members can have a length of about 8 inches to about 24 inches and preferably has a length of about 15 to 20 inches.

It is to be appreciated that the overall shape and configuration of the boat transporting device may be varied, from application to application, as long as the device includes a pair of longitudinal members configured to accommodate a gunwale of a boat, a clamping mechanism supportable by the longitudinal members for securing the boat transporting device to the gunwale of a boat, an axle being secured to the longitudinal members, and a pair of wheels being securable to opposed ends of the axle. For example, the second ends of the longitudinal members can be directly attached to one another by a pivot connection and a single centrally located clamping mechanism, engaging both the longitudinal members and the gunwales of the boat to be carried can be used for securing the device to the desired boat.

Since certain changes may be made in the above described boat transporting device, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I/we claim:

1. A boat transporting device for use by an individual transporting a boat, the boat transporting device comprising:
   a pair of longitudinal members each being configured to extend along and accommodate a longitudinal length of a gunwale of a boat;
   at least one cross member having two opposed ends, each opposed end being pivotally attached to one of the longitudinal members to facilitate pivoting of the longitudinal members relative to the at least one cross member and alignment of the longitudinal members to accommodate the gunwale of a boat;
   at least one clamping mechanism being coupled to the longitudinal members for securing the boat transporting device to the gunwales of a boat;
   an axle being secured to the longitudinal members; and
   a pair of wheels being securable to opposed ends of the axle; and
   the boat transporting device further including a further cross member which has a pair of opposed ends, each opposed end is pivotally attached to one of the longitudinal members, at a location spaced from the at least one cross member, to facilitate movement of the longitudinal members relative to the further cross member and alignment of the longitudinal members with the gunwale of a boat;
   wherein each opposed end of the further cross member has an elongate slot to facilitate adjustable attachment of each opposed end to one of the longitudinal members.

2. The boat transporting device according to claim 1, wherein the at least one cross member is longer than the further cross member to form a substantially A-shaped structure with the longitudinal members and facilitate adjustment of the longitudinal members to accommodate a gunwale of a boat; and
   a further clamping mechanism, for securing the boat transporting device to gunwales of a boat, is supported by at least one cross member.

3. The boat transporting device according to claim 1, wherein each of the longitudinal members has an L-shaped transverse cross section, and a first portion of the L-shaped cross section is disposable along a top surface of the gunwale and a second portion of the L-shaped cross section extends along an outer surface of the gunwale.

4. The boat transporting device according to claim 1, wherein the at least one cross member is adjustably secured to the longitudinal members and the at least one clamping mechanism is freely removable from the longitudinal members.

5. The boat transporting device according to claim 1, wherein each of the clamping mechanisms comprises at least one aperture formed in a central portion of a respective cross member and at least one aperture formed in a central portion of a clamping member with a fastener extending through the at least one aperture formed in a central portion of the clamping member and the respective cross member for sandwiching the gunwales of the boat therebetween.

6. The boat transporting device according to claim 1, wherein the axle is releasably attached to the longitudinal members, via a pair of brackets, to facilitate removal of the axle from the longitudinal members as desired.

7. The boat transporting device according to claim 1, wherein the wheels are releasably attached to the axle to facilitate removal of the wheels from the axle, as desired.

8. A boat transporting device for use by an individual transporting a boat, the boat transporting device comprising:
a pair of longitudinal members each being configured to extend along and accommodate a longitudinal length of a gunwale of a boat;
at least one cross member having two opposed ends, each opposed end being pivotally attached to one of the longitudinal members to facilitate pivoting of the longitudinal members relative to the at least one cross member and alignment of the longitudinal members to accommodate a gunwale of a boat;
at least one clamping mechanism being coupled to the longitudinal members for securing the boat transporting device to gunwales of a boat;
an axle being secured to the longitudinal members; and
a pair of wheels being securable to opposed ends of the axle;
wherein each of the longitudinal members has a plurality of apertures provided therein proximate the one end thereof; and
the at least one cross member has a pair of outer apertures located proximate each opposed end of the at least one cross member and a pair of intermediate apertures formed intermediate the outer apertures, and a further clamping mechanism includes a clamping member which has a pair of through holes located to mate with the intermediate apertures of the at least one cross member, and the at least one cross member is secured to the longitudinal members via fasteners extending through the apertures of the longitudinal members and outer apertures of the at least one cross member and the at least one cross member is secured to the clamping member via fasteners through the intermediate apertures of the at least one cross member and the mating through holes whereby the clamping member and the at least one cross member sandwich the longitudinal members and the gunwales of a boat therebetween.

9. A boat transporting device for use by an individual transporting a boat, the boat transporting device comprising:
a pair of longitudinal members with each longitudinal member having an L-shaped transverse cross-section configured to accommodate a longitudinal length of a gunwale of a boat;
each longitudinal member having a bracket attached thereto for supporting an axle;
an axle being supported by the brackets and the axle being rotatable relative to the brackets and the pair of longitudinal members;
a pair of wheels being secured to opposed ends of the axle to facilitate conveyance of the boat transport device along a desired surface; and
at least one clamping mechanism for securing the boat transporting device to the gunwales of a boat, the at least one clamping mechanism comprising a first mating pair of spaced apart cross members which, during use, sandwich both the pair of longitudinal members and the gunwales of a boat therebetween to facilitate attachment of the boat transporting device to a desired boat.

10. The boat transporting device according to claim 9, wherein the boat transporting device includes a second clamping mechanism which comprises a second mating pair of cross members which, during use, sandwich both the pair of longitudinal members and the gunwales of a boat therebetween to facilitate attachment of the boat transporting device to a desired boat, and the at least one clamping mechanism is spaced from the second clamping mechanism.

11. The boat transporting device according to claim 10, wherein each opposed end of one of the second mating pair of spaced apart cross members is pivotably attached to a respective one of the longitudinal members to facilitate secure attachment to the longitudinal members while maintaining adjustment thereof.

12. The boat transporting device according to claim 10, wherein the at least one clamping mechanism is removably attached to the boat transporting device and the second clamping mechanism is permanently attached to the boat transporting device.

13. The boat transporting device according to claim 10, wherein the boat transporting device includes a third cross member; and each opposed end of the third cross member has an elongate slot therein; the third cross member is attached, via each one of the elongate slots, to an end portion of one of the longitudinal member; and the slots facilitate adjustment of the longitudinal members relative to one another.

14. The boat transporting device according to claim 9, wherein the boat transporting device includes a further cross member; and each opposed end of the further cross member has an elongate slot therein; the further cross member is attached, via each one of the elongate slots, to an end portion of one of the longitudinal member; and the slots facilitate adjustment of the longitudinal members relative to one another.

15. The boat transporting device according to claim 13, wherein the at least one clamping mechanism is shorter than the second clamping mechanism to form, with the longitudinal members, a substantially A-shaped structure and facilitate adjustment of the longitudinal members to accommodate a gunwale of a boat.

16. The boat transporting device according to claim 9, wherein a first portion of the L-shaped cross section is disposable along a top surface of the gunwale and a second portion of the L-shaped cross section extends along an outer surface of the gunwale.

17. The boat transporting device according to claim 10, wherein a central portion of each of the first and the second mating pair of cross members have at least one aperture formed therein, and a fastener extends through the at least one aperture of the mating pair of cross members to facilitate sandwiching of the longitudinal members and the gunwales of the boat therebetween.

18. The boat transporting device according to claim 9, wherein the axle is releasably attached to the longitudinal members, via the brackets, to facilitate removal of the axle from the longitudinal members.

19. The boat transporting device according to claim 9, wherein the wheels are releasably attached to the axle to facilitate removal of the wheels from the axle, as desired.

* * * * *